United States Patent Office 3,093,659
Patented June 11, 1963

3,093,659
ANTIFUNGAL AND INSECTICIDAL HALOKOJIC ACID METAL COMPLEXES
William E. Bell, Bayside, N.Y., and Jay S. Buckley, Groton, and Philip N. Gordon, Old Lyme, Conn., assignors to Chas. Pfizer & Co., Inc., New York, N.Y., a corporation of Delaware
No Drawing. Filed June 20, 1956, Ser. No. 592,474
4 Claims. (Cl. 260—345.9)

This invention relates to a group of organo-metallic compounds possessing useful fungicidal properties. More particularly it relates to a group of metal chelates or complexes of the halokojic acids.

Various materials have been proposed in the past for use as fungicides in agriculture and for various industrial applications. These include Bordeaux mixture which is a mixture of copper sulfate, lime and water; various sulfur compounds, as well as sulfur itself; and certain cyclic nitrogen compounds. All of these materials suffer from certain disadvantages. For example, suspending difficulties are sometimes encountered with commercial preparations of Bordeaux mixture which result in clogging of the spray nozzles employed in their application. Furthermore, difficulty is sometimes encountered due to the excessive release of copper from the mixture which has a toxic reaction on the plant. Toxic reactions are similarly noted in many instances with the various sulfur and nitrogen compounds that have been suggested for use as fungicides.

The halokojic acids have the following structure

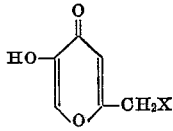

wherein X is a halogen atom i.e., a fluorine, a chlorine, a bromine, or an iodine atom. The halokojic acids are structurally related to kojic acid which has the above formula wherein X is the hydroxyl group and the systematic name 5-hydroxy-2-hydroxymethylpyran-4-one.

Chlorokojic acid, 5-hydroxy-2-chloromethylpyran-4-one, and iodokojic acid, 5-hydroxy-2-iodomethylpyran-4-one, are known in the art. The bromo compound is a new compound whose preparation is described in copending application Serial No. 592,473, now abandoned, filed herewith. The systematic name for bromokojic acid is 5-hydroxy-2-bromomethylpyran-4-one. One method that has been used for preparing chlorokojic acid, involves treatment of kojic acid with thionyl chloride. Iodokojic acid has been prepared from chlorokojic acid by treatment with potassium iodide in acetone. Fluorokojic acid may be prepared from one of the other halokojic acids by treatment according to well known techniques with various metal fluorides such as mercuric fluoride, silver fluoride, and antimony trifluoride.

Of the halokojic acids chlorokojic has been reported to have a degree of fungicidal activity against certain organisms. However, it too has certain serious shortcomings. For example, it is an irritating compound being a highly active sternutator. Chlorokojic acid is hazardous to handle for this reason. From this point of view, the other halokojic acids also lack properties necessary to make them desirable fungicides. Iodokojic acid is particularly disadvantageous since iodine is released from it on warming or prolonged standing. It has been observed to have a defolient action on green plants. Chlorokojic acid, while more stable than the iodo compound also suffers from a stability problem and indeed has been observed to have a herbistatic action on green plants. A further serious disadvantage of the halokojic acids is the difficulty encountered in formulating them into suitable compositions for use in agriculture. They are very light and finely divided powders which have a tendency to float on water when it is attempted to prepare suspensions of them. This disadvantage coupled with their phytotoxicity and irritating properties militates against their use in agriculture as fungicides.

The above disadvantages have been overcome by the valuable metal chelates of the present invention. These materials by and large are dense, insoluble solids which are readily formulated into either solid or liquid fungicidal compositions, and they are non-irritating to humans either on exposure to the dust by breating or on contact with the skin. In addition some of them possess toxicity for the larvae of certain insects. Copper chlorokojic, for example, has been found to possess larvacidal activity for mosquito larvae.

The precise structure of the valuable chelates of this invention is not known, but it is thought that, for example, with a divalent metal having a coordination number of 4 such as copper, that salt formation occurs at the acidic 5-hydroxyl group between the metal and two molecules of the halokojic acid. Further bonding of the metal occurs at the carbonyl oxygen atom in the 4-position of the halomethylkojic acid producing a bicyclic structure about the metal containing both coordinate and covalent bonds. Tri and quadrivalent metals having coordination numbers of 6 and 8 form chelates with respectively three and four molecules of the halokojic acid. In these instances tri and tetracyclic structures about the metal are thought to exist. While these structural formulations are conjectural, it is a fact that the metal chelates of this invention are distinct chemical compounds of uniform and reproducible composition.

It has been found that the metal chelates of the above types and particularly those derived from chlorokojic acid, bromokojic acid, and iodokojic acid containing metals having atomic numbers in the range 12 to 82 inclusive which includes such metals as aluminum, iron, copper, cobalt, zinc, mercury, magnesium, calcium, and barium have valuable fungicidal properties. Those metals having coordination numbers of 4 to 8 are preferred. By virtue of this activity these materials are useful in both agricultural and industrial applications. While the rare earth elements, whose atomic numbers fall within the above atomic number range, also have fungicidal activity, for practical reasons they are of less interest due to their limited availability. The rare earth elements have atomic numbers from 57 to 71. The preferred chelates, then, are those of chloro-, bromo-, and iodokojic acid containing metals whose atomic numbers are from 12 to 56 and 72 to 82.

The term fungicide is meant to include not only the property of destroying fungi but also the property of inhibiting the germination of the spores or the sporulation of the fungi, a property sometimes referred to as fungistatic or fungitoxic. As pointed out above the valuable fungicidal metal chelates of the halokojic acids have important applications in agriculture against certain fungus diseases of plants. In particular, these agents have been found to be effective against early blight of tomatoes (*Alternaria solani*), bean mildew (*Erysiphe polygoin*), and bean rust (*Uromyces appendiculatus*). Further applications of these valuable metal chelates include various industrial uses where mildew or mold attack is a problem. They are useful in the textile, paint, paper, glue and adhesive, and plastic industry. For example, the incorporation of the metal chelates of this invention such as zinc iodokojate or copper iodokojate into paint affords protection of the dried painted surface against mildew (*Pullu-*

*laria pullulons*). Similarly, these materials are effective in protecting so-called emulsion type paints such as casein paints during storage. When stored in the container at ambient temperature, such paints are subject to fungicidal attack resulting in a breaking of the emulsion rendering the paint generally unfit for use and sometimes producing undesirable odoriferous degradation products. Other examples of applications of the metal complexes of this invention include fabric mildew proofing, protection of plastics, preservatives for paper to prevent slime mold formation and in particular for cardboard containers subjected to high temperature and humidity conditions, and as preservatives for leather. They have also been found to possess activity against certain human pathogens such as *Candida albicans* and *Trichophyton rubrum*. In all of these uses, the unexpected stability of these materials and the lack of irritating effects are unique and important advantages.

The metal chelates of this invention are very readily prepared by simply bringing together in solution the desired halokojic acid and a source of the appropriate metal. Both aqueous and non-aqueous solvents have been employed. For operation in aqueous solution, it is necessary to employ a soluble salt of the halokojic acid since the acids are insoluble in water. One convenient method is to suspend the halokojic acid in water and then to bring it into solution by the addition of an alkali for example, sodium hydroxide. Buffer solutions may also be used. The metal salt is then dissolved in water and the two solutions are mixed. This type of process is ordinarily carried out at room temperature since the halokojic acids are subject to hydrolysis in alkaline solution at elevated temperatures. Temperatures up to about 40° C. are satisfactory. A more convenient method of operation involves the use of organic solvents such as the lower alkanols when the inorganic salt is soluble in such a solvent. Other organic solvents may of course be used. When non-aqueous solvents are used, elevated temperatures up to about 100° C. may be used since there is no danger of hydrolysis. The use of an elevated temperature has the advantage of permitting the use of smaller solvent volumes and better control of the crystallization rate thus permitting control of the particle size of the precipitate. In any case, the halokojic acid metal chelate precipitates from the reaction mixture and is collected by some suitable means such as filtration or centrifugation, washed and dried. The composition of the product so obtained generally corresponds to the calculated value based on the above structural presentation. Further purification is ordinarily unnecessary. In most instances these chelate products are highly colored. The colors vary from deep red to tan, yellow, and green depending primarily upon the metal contained in the chelate. Variations in shade do occur resulting probably from differences in particle size, etc. Specific examples for the preparation of a number of these materials are given hereinafter.

The antifungal activity of these valuable products was demonstrated by a number of methods. In one series of tests the agar incorporation method was used. According to this method a nutrient medium was prepared and cast into agar plates. Before adding the agar and pouring into the plates, the medium was inoculated with spores of the particular organism under consideration and the test compound added at a predetermined test concentration. In most instances a concentration of 100 parts per million of the test compound was employed although with some, tests at lower concentrations were carried out. The results of these tests are given in Table I. In this table the values obtained when chlorokojic acid, bromokojic acid and iodokojic acid were used are given for comparison. It can be seen from this table that a change in the antifungal spectrum of these valuable chelates is obtained. This is particularly noticeable with the industrial contaminants, *Aspergillus niger* and *Penicillum funiculosum*.

TABLE I

*Comparative Antifungal Activity of the Halokojic Acids and Chelates Thereof at 100 p.p.m. by the Agar Incorporation Method*

| Halokojic acid | Metal chelate | Candida albicans No. 8 | Trichophyton rubrum | Alternaria solani | Rhinoctania solani | Aspergillus niger | Penicillium funiculorum | Cladosporium cladosporoides |
|---|---|---|---|---|---|---|---|---|
| Chlorokojic acid | Free acid | + | — | — | × | + | + | × |
|  | $Cu^{II}$ | + | — | + | + | — | — | × |
| Bromokojic acid | Free acid | — | — | — | × | — | — | × |
|  | $Cu^{II}$ | × | — | — | × | × | × | × |
|  | $Fe^{II}$ | + | — | — | — | — | — | — |
|  | $Zn^{II}$ | + | — | — | — | — | — | — |
| Iodokojic acid | Free acid | — | — | — | — | × | — | — |
|  | $Zn^{II}$ | + | — | —[1] | — | — | — | — |
|  | $Cu^{II}$ | — | — | —[1] | — | — | — | — |

[1] Complete inhibition at 10 p.p.m. or less.

NOTE.— +=Growth; —=No growth; ×=Reduced growth.

Zinc iodokojate, copper iodokojate, cobalt chlorokojate, and mercury chlorokojate were tested further by the agar incorporation method against an additional group of organisms. Concentrations of the test compounds of 100, 10 and 1 part per million were used. The results of this test are arranged in Table II. Of 64 species tested, copper iodokojate inhibited the growth of 52, and zinc iodokojate inhibited 45. Of the 61 species tested against cobalt chlorokojate and mercury chlorokojate, the growth of 12 was inhibited by the former and 49 by the latter. In addition, mercury chlorokojate demonstrated remarkable activity at the lower levels. Ferric chlorokojate was similarly tested and found to inhibit *Histoplasma capsulatum* at 100 p.p.m.

TABLE II

*Antifungal Activity of Representative Metal Chelates at 100 p.p.m.*

| ORGANISM | Cupric iodokojate | Zinc iodokojate | Cobalt chlorokojate | Mercury chlorokojate |
|---|---|---|---|---|
| *Histoplasma capsulatum* | —[1] | —[1] | —[1] | —[1] |
| *Blastomyces brasiliensis* | + | + | × | + |
| *Blastomyces dermatitidis* | + | + | × | × |
| *Trichophyton sulfureum* | —[1] | — | × | × |
| *Trichophyton violaceum* | + | + | + | + |
| *Sporotrichum schenckii* | + | + | + | + |
| *Hormodendrum compactum* | + | + | + | + |
| *Cryptococcus neoformans* | + | + | + | + |
| *Phialophora verrucosa* | — | — | × | × |
| *Candida albicans* No. 8 | — | + | + | —[1] |
| *Candida albicans* No. 9 | — | + | + | + |
| *Candida albicans* No. 11 | + | + | + | + |
| *Candida albicans* No. 15 | + | + | (²) | (²) |
| *Candida albicans* "c" | + | + | + | + |
| *Epidermophyton floccosum* | —[1] | — | — | + |
| *Microsproum audovini* | —[1] | × | — | + |
| *Trichlphyton rubrum* | — | — | + | + |

TABLE II—Continued

| | Cupric iodokojate | Zinc iodokojate | Cobalt chlorokojate | Mercury chlorokojate |
|---|---|---|---|---|
| PHYTOPATHOGENS | | | | |
| Alternaria solani | − | − | + | −[1] |
| Botrytis alli | − | − | + | − |
| Septoria noderum | −[1] | − | − | −[1] |
| Endothia parasitica | X | X | (2) | (2) |
| Neocosmospora vasinfecta | − | − | + | −[1] |
| Fusarium oxysporium | − | − | + | − |
| Nematospora coryli | + | + | + | −[1] |
| Ceratostomella ulmi (Ophiostoma) | X | − | + | − |
| Sclerotinia fructicola | −[1] | − | + | −[1] |
| Collectotrichum circinans | −[1] | −[1] | + | −[1] |
| Verticillium albo-atrum | −[1] | − | + | −[1] |
| Physalospora malorum | X | − | + | −[1] |
| Helminthosporium victoriae | −[1] | −[1] | − | −[1] |
| Hormondendrum resiniae | −[1] | X | − | −[1] |
| Glomerella cingulata | −[1] | X | + | −[1] |
| Phoma batae | −[1] | X | + | −[1] |
| Fusarium lycopersici var. bulbigenum | − | − | + | −[1] |
| Rhizoctonia solani | −[1] | − | + | − |
| Pthium debaryanum | − | − | + | − |
| Helminthosporium terricum | − | −[1] | + | −[1] |
| Mycogene penniciosa | −[1] | − | − | − |
| Penicillium sp. marathon No. 7 | − | − | (2) | (2) |
| Rhizopus nigricans | − | X | + | − |
| Penicillium steckii | − | X | + | −[1] |
| Aspergillus niger | − | − | + | −[1] |
| Penicillium frequentans | − | − | + | − |
| Penicillium citrinum | − | − | + | − |
| Penicillium funiculosum | + | + | + | − |
| Aspergillus nidulous | + | + | + | − |
| Penicillium soppi | − | + | + | −[1] |
| Aspergillus terreus | X | + | + | − |
| Aspergillus fumigatus | − | + | + | − |
| Paecilomyces varioti | − | − | + | − |
| Hormondendron sp. (Wehymer) | −[1] | −[1] | − | −[1] |
| Mucor mucedo | − | − | + | + |
| Penicillium oxalicum | − | X | + | + |
| Saccharomyces ceresisiae | − | − | + | + |
| Schizosaccharomyces octosporus | −[1] | −[1] | + | −[1] |
| Pullularia pullulons | − | − | + | − |
| Byssochlamya fulva | − | − | + | −[1] |
| Cladosporium herbarum | − | −[1] | + | −[1] |
| Cladosporium (Hormondendrum) cladosporoides | − | − | − | −[1] |
| Endomyces fibuliger | − | + | + | − |
| Margarinomyces bubaki | − | + | + | − |
| Oospora lactis | −[1] | −[1] | + | − |
| Penicillium digitatum | X | + | + | − |

[1] Complete inhibition at 10 p.p.m. or less.  [2] Not tested.

NOTE.— + = Growth; − = No growth; X = Reduced growth.

Some of the valuable halokojic metal chelates of this invention were evaluated in a contact test. In this test small plugs were cut from agar plates covered with a mat of fully sporulated test fungus which served as the inoculant. Aqueous solutions having a concentration of 1% of the test compound were prepared. Suitable organic solvents were employed with the compounds insoluble in water to the extent of 1%. The agar plugs containing the fully sporulated test fungus were then exposed to this solution for 15 minutes. After exposure, the plugs were removed from the test solution and washed with sterile broth to remove residual test solution. The plugs were then placed on agar plates and incubated. The test compound was considered to be active if the fungus failed to grow after incubation in this fashion and inactive if the fungus grew. A variety of different species of fungi were selected for this test. In all, seven species were used. Two of these were human pathogens causing such diseases as ringworm and athlete's foot; two were plant pathogens, one causing early blight of tomatoes and the other damping off; and three were common contaminants of industrial importance of concern to the textile fabric industry and the meat industry. The results of the test are arranged in Table III. This table shows that zinc chlorokojate has a rather wide range of activity in preventing the growth of four and seven species when employed in this contact method of disinfecting an agar plug of the fungus. Aluminum chlorokojate is somewhat more restricted in its range of activity preventing the growth of two of seven species.

The halokojic acid metal chelates of this invention have low water solubilities. They are therefore well suited as fungicides for topical application since they are not readily washed from the plant or fabric to which they are applied. One convenient method for applying them is as an aqueous spray. Aqueous suspensions or emulsions are readily prepared by incorporating the chelate with suitable wetting or emulsifying agents such as the polysorbates, sodium stearate, and salts of abietic acid or the like. In such event, concentrates of the metal chelates may be prepared for subsequent dilution prior to use. For their ultimate application it is preferred to use suspensions having concentrations of the chelate in the range of 0.001% to about 10%. However, suspensions having higher concentrations may be prepared for subsequent dilution as indicated above. The chelates may also be applied as dusts. For this purpose, it is convenient to mix them or to coat them with a suitable carrier, such as clay, magnesium carbonate, talc, tricalcium phosphate, etc. For use in fabrics, paper, etc., they are incorporated directly into the composition which it is desired to protect. This can be conveniently accomplished by treatment of the material with an aqueous suspension such as the type referred to above. Suspensions in volatile organic solvents may also be used. These valuable fungicides may be used with other active ingredients such as antibacterial agents, insecticides, and even in combination with other fungicides. For topical application to animals including humans, the metal chelates are associated with suitable pharmaceutical carriers which can be in the form of ointments, lotions, suppositories or powders suitable for use as dusting powders or insufflation powders. For this use concentrations of about 0.001% to 1% are preferred.

In addition to the above tests a number of these metal chelates were employed in tests on plants afflicted with various fungus infections. Control groups of plants were maintained in each experiment for comparison purposes to indicate the virulence of the infecting organism. In such a test against early blight of tomatoes, copper chlorokojate, zinc chlorokojate, copper iodokojate, and zinc iodokojate were found to eradicate the disease in 90%

TABLE III

*Contact Time Antifungal Activity of Zinc and Aluminum Chlorokojate*

[15 minute exposure to a 1% solution]

| Compound | Candida albicans | Trichophyton sulfureum | Alternaria solani | Pythium debaryanum | Aspergillus niger | Penicillium funiculorum | Cladosporium cladosporoides |
|---|---|---|---|---|---|---|---|
| Zinc chlorokojate | + | − | − | − | + | + | − |
| Aluminum chlorokojate | + | − | + | + | + | + | − |

NOTE.— + = Growth; − = No growth.

of the plants in the test group employing a spray containing 400 parts per million of the test compound. Copper chlorokojate, and copper bromokojate were similarly found active against bean mildew. Zinc iodokojate had therapeutic activity in bean plants infected with bean rust (*Uromyces appendiculatus*) when applied to the soil in which the bean plants were growing.

The following examples are given to further illustrate this valuable invention but they are not considered to be limiting thereof in any way. Various changes and modifications may be made within the scope of the appended claims.

EXAMPLE I

Two different types of procedure were used in the preparation of these compounds. In one water was used as the solvent and in the other an organic solvent. Method A using water as the solvent was used in those cases where the metal salt employed was insoluble in ethanol. Method B using ethanol-chloroform was used when the solubility of the metal salt permitted.

(A) *Use of water as the solvent; ferric bromokojate.*—Bromokojic acid, 4.10 g. (0.02 mole) was added to 500 ml. of water containing 0.80 g. (0.02 mole) of sodium hydroxide. The mixture was heated gently yielding a clear reddish-brown solution. A solution of ferric chloride hexahydrate, 1.80 g. in 100 ml. of water, was prepared and added to this solution. The solution turned red-brown on mixing and a dark red precipitate formed. The mixture was allowed to cool to room temperature, digested for several hours at room temperature and the crop collected. The dark red solid was washed on the filter with ice water and then dried in vacuo.

TABLE IV

*Preparation of the Halokojic Chelates*

| Compound | Procedure | Metal anal. | | Color |
|---|---|---|---|---|
| | | Calc'd | Found | |
| Fe$^{III}$ chlorokojate | B | 10.40 | 10.32 | Deep red. |
| Co$^{II}$ chlorokojate | B | 15.6 | 11.0 | Tan. |
| Al chlorokojate | A | 5.3 | 5.1 | Yellow. |
| Zn chlorokojate | A | 14.25 | 14.50 | Lt. yellow. |
| Hg chlorokojate | A | 29.6 | 31.2 | Lt. green. |
| Cu$^{II}$ bromokojic | B | (1) | (1) | Green. |
| Zn bromokojic | A | (2) | (2) | White. |
| Zn iodokojate | B | (3) | (3) | Lt. yellow. |
| Cu$^{II}$ iodokojate | B | (2) | (4) | Green. |

$^1$ Calcd. for $(C_6H_4O_3Br)_2Cu$: C, 30.56; H, 1.71; Br, 33.90; Cu, 13.46. Found: C, 30.51; H, 2.05; Br, 34.12; Cu, 13.33.
$^2$ Calcd. for $(C_6H_4O_3Br)_2Zn$: C, 30.44; H, 1.70; Br, 33.76; Zn, 13.81. Found: C, 20.41; H, 1.77; Br, 34.15, Zn, 13.73.
$^3$ Calcd. for $(C_6H_4O_3I)_2Zn$: C, 25.40; H, 1.42; I, 44.74; Zn, 11.52. Found: C, 26.04; H, 1.54; I, 44.83; Zn, 10.71.
$^4$ Calcd. for $(C_6H_4O_3I)_2Cu$: C, 25.48; H, 1.43; I, 44.88; Cu, 11.24. Found: C, 27.01; H, 1.74; I, 44.65; Cu, 11.32.

(B) *Use of ethanol-chloroform as the solvent; cupric bromokojate.*—Bromokojic acid, 10.3 g., was dissolved in hot ethanol, 200 ml. A clear solution resulted which was added to a hot solution of cupric acetate monohydrate, 5 g. in 50 ml. of ethanol and 25 ml. of chloroform. A finely divided green precipitate formed almost immediately. The mixture was cooled to room temperature and the crop collected. The product was washed on the filter with ethanol and air dried yielding 10.8 g. of a microcrystalline product.

EXAMPLE II

*Zinc iodokojate.*—This chelate was prepared essentially by procedure B. Iodokojic acid, 12.6 g., was dissolved in warm ethanol. To this solution was added a solution of 5.5 g. of zinc acetate dihydrate in 75 ml. of hot ethanol and 25 ml. of chloroform. An immediate precipitate formed. The mixture was allowed to cool to room temperature and the solid collected, washed with ethanol, and air dried yielding 10 g. of product.

Analytical data is tabulated in Table IV.

EXAMPLE III

*Alkaline earth halokojates; magnesium bromokojate.*—This material was prepared substantially by procedure B as applied to cupric bromokojate. Bromokojic acid, 10.3 g., was dissolved in hot ethanol, 200 ml. This solution was slowly added to a warm solution of 5.6 g. of magnesium chloride hexahydrate in 50 ml. of ethanol. A precipitate formed which was collected after cooling, washed on the filter with ethanol and air dried.

Calcium bromokojate was prepared by an analogous procedure.

*Barium chlorokojate.*—This material was prepared by procedure A substantially as described for ferric bromokojate. Chlorokojic acid, 32 g., was suspended in 200 ml. of water and a solution of 8 g. NaOH in 50 ml. of water was added. The solution was warmed to effect solution. A solution of 13.9 g. of barium chloride in 100 ml. of water was then added to the above solution. The solution was cooled to room temperature, and the precipitate collected and washed first with water and then with alcohol. It was air dried.

EXAMPLE IV

A suitable fungicidal ointment composition consists of

| | G. |
|---|---|
| Stearic acid | 900 |
| Glycerine | 800 |
| Anhydrous lanolin | 80 |
| 2-amino-2-methyl-1-propanol | 40 |
| Distilled water | 2100 |
| Copper iodokojate | 40 |

The stearic acid and lanolin were melted together at about 70° C. The glycerine, 2-amino-2-methyl-1-propanol, and water were mixed and heated to about 70° C. and the copper iodokojate added to this solution followed by the stearic acid-lanolin melt. The mass was thoroughly mixed and milled to avoid lumps and filled into two ounce jars. The composition contains about 1% of the active fungicidal agent, copper iodokojate.

EXAMPLE V

A suitable fungicidal dusting powder consists of:

| | Percent |
|---|---|
| (A) Talc USP | 98 |
| (B) Zinc iodokojate | 2 |

The two ingredients were ground together to a powder which passes through a 200 mesh screen and the powder then filled into boxes.

EXAMPLE VI

A suspension was prepared by finely grinding copper chlorokojate and adding 100 g. of this material to 1 l. of water containing 1 g. of polysorbate 80. This mixture was vigorously agitated to suspend the solid and was then further diluted to 250 l. with water to obtain a formulation suitable for application to plants. The resulting dispersion contained 400 parts per million of the fungicide and was found effective in the treatment of early blight of tomatoes.

EXAMPLE VII

Typical dust formulations of our fungicides were prepared as follows: equal parts of the halokojate chelate, for example ferric bromokojate, and fuller's earth were placed in a hammermill and milled for a period of one hour and then screened, collecting the fraction passing through a mesh screen. This 50% by weight formulation was stable and could be stored and shipped as such. For use a further dilution was made by milling 2 parts of 50% formulation with an additional 98 parts of fuller's earth. The resulting dust was suitable for use on plants.

What is claimed is:
1. A copper (II) complex of iodokojic acid.
2. A copper (II) complex of bromokojic acid.
3. A mercury (II) complex of chlorokojic acid.
4. A zinc complex of bromokojic acid.

References Cited in the file of this patent
UNITED STATES PATENTS

| | | |
|---|---|---|
| 2,460,188 | O'Kane et al. | Jan. 25, 1949 |
| 2,752,283 | Metivier | June 26, 1956 |

OTHER REFERENCES

Barham et al.: "Trans. Kansas Acad. Sci." 37, pages 91–113 (1934).